Sept. 26, 1967  G. T. ELIASSEN ETAL  3,343,639
TRANSFER UNIT FOR ROLLER-TYPE CONVEYOR SYSTEM
Filed March 15, 1966  4 Sheets-Sheet 2

INVENTORS
Gunnar Thure Eliassen
Birje Egon Andersson
Allan Ivar Nord
ATTORNEY

Sept. 26, 1967    G. T. ELIASSEN ETAL    3,343,639
TRANSFER UNIT FOR ROLLER-TYPE CONVEYOR SYSTEM
Filed March 15, 1966    4 Sheets-Sheet 3

FIG. 4

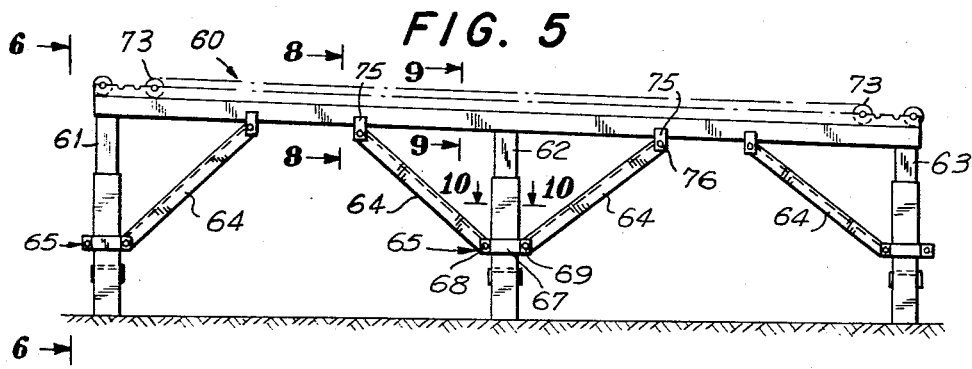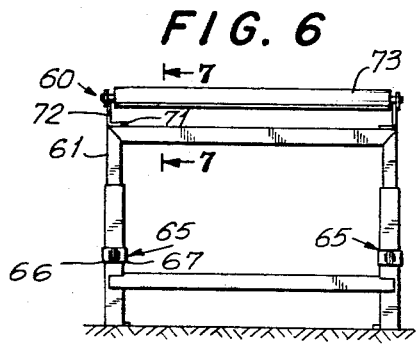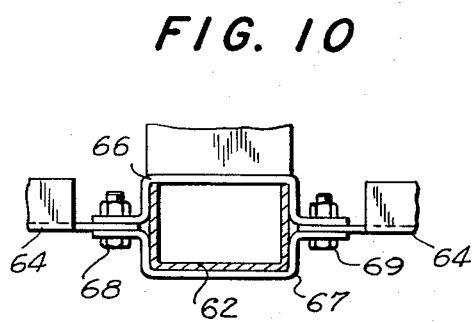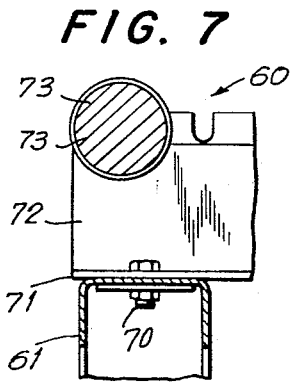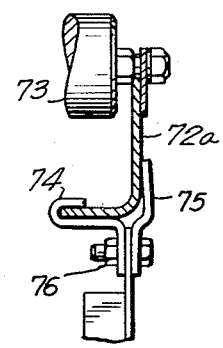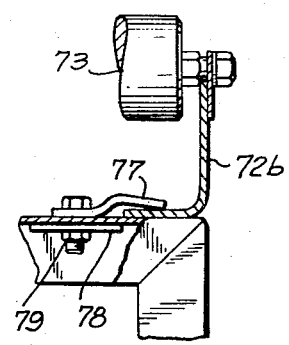

United States Patent Office 3,343,639
Patented Sept. 26, 1967

3,343,639
TRANSFER UNIT FOR ROLLER-TYPE CONVEYOR SYSTEM
Gunnar Thure Eliassen, Partille, and Börje Egon Andersson and Allan Ivar Nordh, Saffle, Sweden, assignors to Aktiebolaget Electrolux, Stockholm, Sweden, a corporation of Sweden
Filed Mar. 15, 1966, Ser. No. 534,383
Claims priority, application Sweden, Mar. 15, 1965, 3,354/65
5 Claims. (Cl. 193—36)

ABSTRACT OF THE DISCLOSURE

A transfer unit for a roller conveyor system having a plurality of spaced rollers in a first roller conveyor which are shiftable between perpendicular and inclined positions and along which articles move by gravity on the first conveyor when the rollers are in their perpendicular positions and from which the articles moving by gravity are diverted from the first roller conveyor to a second roller conveyor when the rollers are in their inclined positions.

Figure 1:
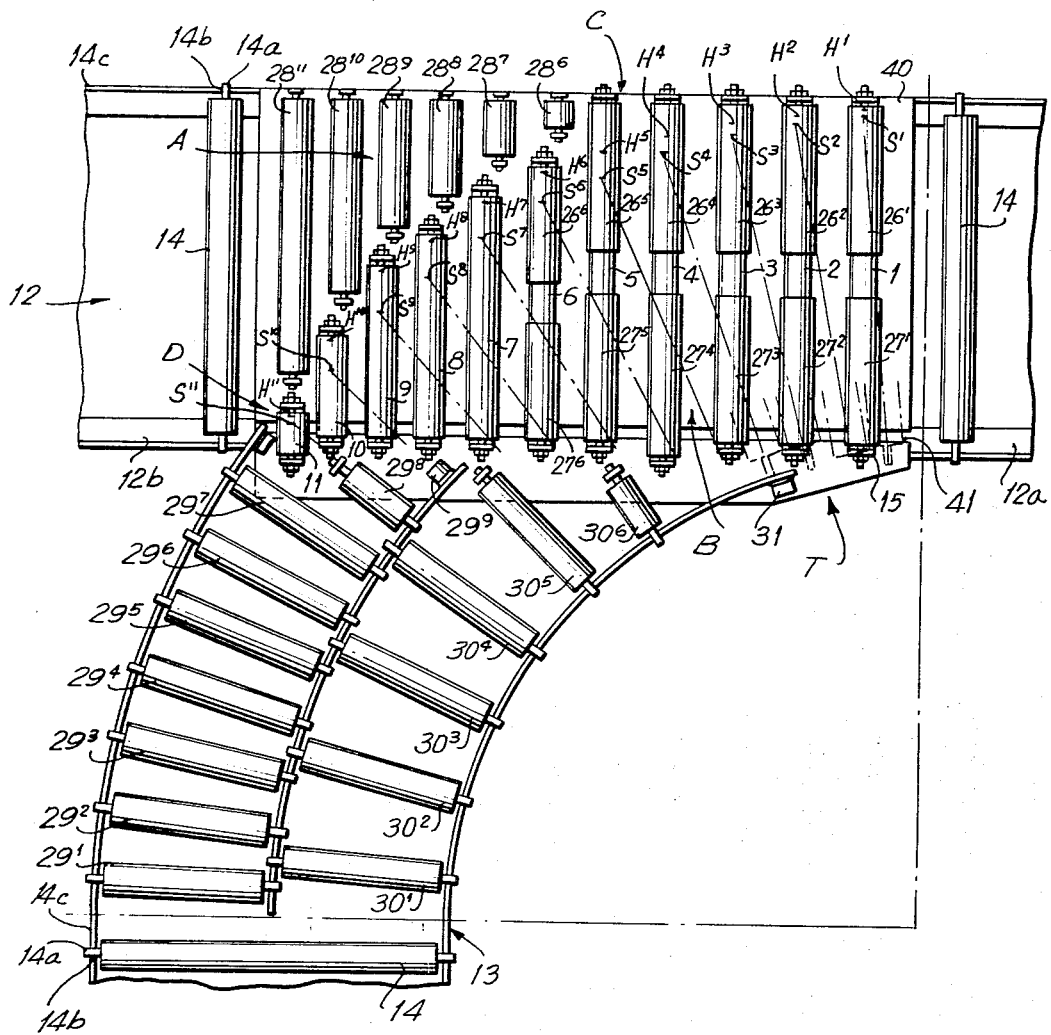

Our invention relates to roller conveyor systems of the kind in which articles move thereon by gravity, and more particularly to transfer units in systems of this kind for selectively transferring articles by gravity from a first roller conveyor to a second roller conveyor.

An object of our invention is to provide in a system of this kind an improved transfer unit having in a first roller conveyor a plurality of spaced rollers which are shiftable between perpendicular and inclined positions, the rollers in their perpendicular positions promoting gravity movement of articles on the first roller conveyor and in their inclined positions promoting gravity movement of articles from the first roller conveyor to a second roller conveyor.

Another object is to provide an improved transfer unit of this type having roller means which form a part of the first roller conveyor and define first and second areas of the transfer unit, the roller means in the first area comprising spaced rollers rotatable about fixed axes substantially perpendicular to the direction of movement of articles on the first roller conveyor and the roller means in the second area comprising rollers shiftable between perpendicular and inclined positions, the line of demarcation between the rollers in the first area and the rollers in the second area extending diagonally across the top of the transfer unit in such manner that when the rollers in the second area are in their inclined positions, they will always exercise control over articles on the first roller conveyor that move thereon and function to divert the articles from the first roller conveyor to the second roller conveyor.

A further object is to provide an improved transfer unit in which the rollers are shifted between their perpendicular and their inclined positions by moving the ends of the rollers nearer the second roller conveyor back and forth lengthwise of the first roller conveyor between their perpendicular and their inclined positions and by simultaneously moving therewith the opposite ends of the rollers remote from the second conveyor back and forth transversely of the first roller conveyor between their perpendicular and their inclined positions.

A still further object is to provide such a transfer unit in which the rollers have end shafts defined by members which rotatably support the end shafts and have elements depending downward therefrom, the elements at the ends of the rollers nearer the second roller conveyor being movable in a straight line lengthwise of the first roller conveyor which is defined by a first elongated slot in horizontally disposed structure in which the downward depending elements extend and are horizontally movable, and the elements at the ends of the rollers remote from the second roller conveyor being movable in straight lines which are perpendicular to the first line and defined by a plurality of slots in the horizontally disposed structure perpendicular to the first slot and in which the downward depending elements extend and are horizontally movable.

A still further object is to provide an improved heat transfer unit of this kind in which the downward depending elements are supported on the slotted structure in such manner that the elements are turnable about their vertical axes to accommodate end shafts responsive to movement of said rollers between their perpendicular and their inclined positions.

A still further object is to provide an improved transfer unit of this kind in which a first roller in the group of rollers shiftable between perpendicular and inclined positions is shifted to an inclined position having a larger angle with respect to its perpendicular position than the angles formed by other rollers between their inclined positions and their respective perpendicular positions and in which successive rollers beyond second rollers at each side of the first roller are shifted to inclined positions having a smaller angle with respect to their perpendicular positions than the rollers adjacent thereto and nearer to the first roller.

Further objects and advantages of our invention will become apparent as the following description proceeds, and the features of novelty which characterize our invention will be pointed out with particularity in the claims annexed to and forming a part of this specification.

In the drawing, FIG. 1 is a top plan view diagrammatically illustrating a transfer unit embodying our invention for selectively transferring articles from a first roller conveyor to a second roller conveyor; FIG. 2 is a fragmentary side elevational view of mechanism for operating the transfer unit shown in FIG. 1; FIG. 3 is a fragmentary side elevational view diagrammatically illustrating the manner in which the mechanism in FIG. 2 is supported by parts of a roller conveyor between the transfer unit; FIG. 4 is a fragmentary perspective view of parts shown in FIGS. 1, 2 and 3 to illustrate details more clearly; FIG. 5 is a side elevational view illustrating improved conveyor structure in which the transfer unit shown in FIGS. 1 to 4 may be employed; FIG. 6 is an end elevational view taken at line 6—6 of FIG. 5; FIG. 7 is a fragmentary sectional view taken at line 7—7 of FIG. 6; and FIGS. 8, 9 and 10 are fragmentary sectional views taken at lines 8—8, 9—9 and 10—10 of FIG. 5.

In FIG. 1 we have diagrammatically illustrated a transfer unit T embodying our invention for selectively transferring articles, such as boxes, pallets or the like, for example, from a first roller conveyor 12 to a second roller conveyor 13 which is transverse to the first roller conveyor. The first and second roller conveyors 12 and 13 each may include a plurality of spaced rollers 14, only a few of which are shown in FIG. 1 in the roller conveyors 12 and 13. The rollers 14 have end shifts 14a journaled in notches 14b formed in the top parts of spaced side rails 14c. The articles move by gravity on the first and second roller conveyors 12 and 13, the articles moving on the first conveyor 12 from right to left in FIG. 1.

In accordance with our invention, we provide the transfer unit T for selectively transferring articles by gravity from the first roller conveyor 12 to the second roller conveyor 13. The transfer unit T comprises a plurality of rollers designated 1 to 11, respectively, which are in the solid line positions illustrated in FIG. 1 when the transfer unit T is ineffective to transfer articles from the first roller conveyor 12 to the second roller conveyor 13. Hence, in the solid line positions of the spaced rollers 1 to 11, respectively, articles approaching the transfer unit T from the right from the first roller conveyor 12 move by gravity on the rollers 1 to 11 and continue to move by gravity on rollers 14 of the first roller conveyor upon leaving the transfer unit T.

When the transfer unit T is rendered operable to selectively transfer articles from the first roller conveyor 12 to the second roller conveyor 13, the rollers 1 to 11, respectively, are shifted in their entirety or in part from their solid line positions to positions which are at acute angles thereto and indicated by dotted lines in FIG. 1. It will be noted in FIG. 1 that rollers 1 to 5 extend across the transfer unit from a region adjacent to one side rail 14c of conveyor 12 to a region adjacent to the opposite side rail 14c and may be referred to as one-piece rollers. Therefore, when the transfer unit T is rendered operable to divert articles from the first roller conveyor 12, the one-piece rollers 1 to 5 are shifted from their solid line positions, which are perpendicular to the lengthwise direction of the first roller conveyor 12, to dotted line positions which are inclined to the lengthwise direction of the first roller conveyor.

Rollers 6 to 11, respectively, may be referred to as two-piece rollers and only the parts thereof nearer to the second roller conveyor 13 are shifted from positions perpendicular to the lengthwise direction of the first roller conveyor 12 to positions inclined to the lengthwise direction of the first roller conveyor. Rollers 1 to 5 and the parts of rollers 6 to 11 which are shifted move from their solid line positions to positions in which they are inclined toward the second roller conveyor 13.

Each of the rollers 1 to 5 and shiftable part of roller 6 in FIG. 1 comprise two sections, one of which is nearer to the second roller conveyor 13 than the other. In FIG. 1 it will be seen that the group of roller sections $27^1$ to $27^6$ of rollers 1 to 6, respectively, are nearer to the second roller section 13 than the group of roller sections $26^1$ to $26^6$ of the rollers 1 to 6, respectively. The rollers $27^1$ to $27^6$ and roller sections $26^1$ to $26^6$, respectively, are rotatable with respect to one another.

The sections $28^6$ to $28^{11}$ of the two-piece rollers 6 to 11, respectively, which are removed from the second roller conveyor 13, are provided with end shafts at opposite ends thereof and are journaled on the transfer unit T in any suitable manner (not shown) independently of the sections of the two-piece rollers 6 to 11 near the second roller conveyor 13. The roller sections $28^6$ to $28^{11}$ are journaled for rotation about fixed axes perpendicular to the direction of movement of articles on the conveyor 12. It will be seen that the sections $28^6$ to $28^{11}$ of the two-piece rollers 6 to 11, respectively, are increasingly longer in the direction of movement of articles from right to left on the transfer unit T. Hence, the shiftable sections of the rollers 1 to 11 in the direction of movement of the articles from right to left on the transfer unit T are successively shorter in length.

The end shafts at the opposing ends of the one-piece rollers 1 to 5 and the end shafts at the opposing ends of the shiftable sections of the two-piece rollers 6 to 11 are journaled in notches formed at the tops of vertical arms of brackets or angle members 15, the horizontal arms of which extend toward one another at the undersides of the rollers, as best shown in FIG. 4. Elements or posts, the upper ends of which are rigidly secured and fixed to the brackets 15, depend downward from the horizontal arms of the brackets. The elements or posts at the ends of the one-piece rollers 1 to 5 and ends of the shiftable sections of two-piece rollers 6 to 11, which are near to the second conveyor 13, are designated $17^1$ to $17^{11}$, as shown in FIG. 2. The posts $17^1$ to $17^{11}$ generally will be referred to by the reference numeral 17.

In the drawing, only one of the elements or posts at the ends of the one-piece rollers 1 to 5 and ends of the shiftable sections of two-piece rollers 6 to 11, which are remote from the second conveyor 13, is illustrated at $117^5$ in FIG. 4. The post $117^5$ in FIG. 4 is associated with the roller 5. The elements or posts for the other rollers 1 to 4 and shiftable sections of rollers 6 to 11 that correspond to posts $117^5$ in FIG. 4 generally will be referred to by the reference numeral 117.

The transfer unit T includes horizontally disposed structure in the form of a plate 40 which is supported in a gap formed between sections 12a and 12b of the first roller conveyor 12, as best shown in FIGS. 1 and 4. The plate 40 is formed with an elongated slot 41 which is substantially straight and extends lengthwise of the first roller conveyor 12 at the side thereof which is near to the second roller conveyor 13. The plate 40 is also formed with a plurality of elongated slots 42 which are substantially straight and opposite the slot 41 and substantially perpendicular thereto.

The elements or posts 17 depend downward through the slot 41 and each of the posts 117 depends downward through a different one of the slots 42. Each of the posts 17 is movable lengthwise of the slot 41 between the perpendicular and the inclined positions of the roller with which it is associated. For example, the solid and dotted line positions of the roller 5 in FIG. 4 illustrate the positions of post $17^5$ in the perpendicular and the inclined positions of this roller. The post 17 of the rollers 1 to 4 and shiftable sections of rollers 6 to 11 also are movable in a similar manner to the post $17^5$ between the perpendicular and the inclined positions of the other rollers.

Each of the posts 117 is movable lengthwise in one of the slots 42 between the perpendicular and inclined positions of the roller with which it is associated. For example, the solid and dotted line positions of the roller 5 in FIG. 4 illustrate the positions of the post $117^5$ in the perpendicular and the inclined positions of this roller. The post 117 of the rollers 1 to 4 and shiftable sections of rollers 6 to 11 also are movable in a manner similar to post $117^5$ between the perpendicular and the inclined positions of the other rollers.

The posts 117 function as the regions at which the ends of the rollers 1 to 5 and ends of the shiftable sections of the rollers 6 to 11, which are remote from the conveyor 13, are supported. In FIG. 5 we have indicated the region $H^5$ as the region at which the roller 5 is supported at its end remote from the conveyor when the roller 5 is perpendicular to the lengthwise direction of the conveyor 12. The position $H^5$ and the positions of the regions $H^1$ to $H^4$ and $H^6$ to $H^{11}$ for the rollers 1 to 4 and 6 to 11, which represent the regions at which the other rollers are supported by the posts 117, are indicated in FIG. 1.

When the rollers are shifted to their inclined positions, as indicated by the dotted lines in FIG. 1 and the dotted line position of roller 5 in FIG. 4, the posts 117 move in the slots 42 from the regions $H^1$ to $H^{11}$ to regions $S^1$ to $S^{11}$. Hence, when movement is imparted to the posts 17 in a lengthwise direction of the slot 41 to divert an article from the conveyor 12 to the conveyor 13, as will be described presently, the posts 17 move in the slot to shift the rollers from their perpendicular positions to their inclined positions. At the same time the posts 117 in the slots 42 move from the regions $H^1$ to $H^{11}$ to the regions $S^1$ to $S^{11}$ responsive to movement of the posts 17 in the slot 41.

The manner in which each of the brackets 15 may be held on the plate 40 in one of the slots 41 and 42 therein is best shown in FIG. 2. FIG. 2 illustrates the bracket 15 for the end of the roller 1 which is near the second conveyor 13 and provided with the post $17^1$. This post for the roller 1 is shown in front of one edge of the elongated slot 41. The post $17^1$ extends through a ring-shaped member 18 which is positioned in the slot 41 and movable lengthwise thereof. The post $17^1$ also extends through aligned openings in plates 19 and 20 which are positioned at the top and bottom surfaces of the plate 40 and bridge the gap across the slot 41.

The post $17^1$ is threaded to receive a nut 21 which holds the plates 19 and 20 against the bottom and top surfaces of the plate 40 and also holds the ring-shaped member 18 in the slot 41 between the plates 19 and 20. The nut 21 is tightened sufficiently to hold the bracket 15 on the plate 40 in the position illustrated in FIG. 2 and yet enable the bracket 15 to move in the slot 41 when movement is imparted to the stem $17^1$, as will be described presently. It will be understood that all of the brackets are alike and their posts 17 and 117 may be mounted for movement on the plate 40 in the same manner that the post $17^1$ is mounted on the plate 40, as shown in FIG. 2 and just described. In view of the foregoing, it will be understood that the posts 17 and 117 can turn about their vertical axes to accommodate end shafts of the rollers in the notches of the brackets 15 responsive to movement of the rollers between their perpendicular and their inclined positions.

Movement is imparted to the posts $17^1$ to $17^{11}$ lengthwise of the slot 41 by an elongated bar or member which, as shown in FIG. 3, is movable back and forth in end bearings $24a$ and $25a$ carried by brackets 24 and 25, respectively, which in turn are fixed to the conveyor sections $12a$ and $12b$, respectively.

A plurality of pairs of actuating members, generally referred to by the reference numeral 23, are fixed to the elongated bar 16. Each of the posts $17^3$ to $17^9$ is disposed between a particular pair of actuating elements $23^3$–$23^{3a}$ to $23^9$–$23^{10}$, respectively. In FIG. 2 it will be seen that the post $17^3$ is disposed between actuating elements $23^3$–$23^{3a}$. Each post from post $17^3$ to post $17^9$ is disposed between and directly in the path of movement of a pair of actuating elements $23^3$–$23^{3a}$ to a pair of actuating elements $23^7$–$23^{10}$, respectively. For reasons that will be given presently, posts $17^1$, $17^2$, $17^{10}$ and $17^{11}$ are provided with horiontal extension arms $43^1$, $43^2$, $43^{10}$ and $43^{11}$ to the outer ends of which are fixed downward extending elements or pins $22^1$, $22^2$, $22^{10}$ and $22^{11}$ which are disposed between pairs of actuating elements $23^1$–$23^2$, $23^2$–$23^3$, $23^{10}$–$23^{11}$ and $23^{11}$–$23^{11a}$, respectively. Extension arms $43^1$, $43^2$, $43^{10}$ and $43^{11}$ are respectively provided with guide members $44^1$, $44^2$, $44^{10}$ and $44^{11}$ which extend upward into the elongated slot 41 and functions to hold elements or pins $22^1$, $22^2$, $22^{10}$ and $22^{11}$ in the path of movement of the pairs of actuating members adapted to impart movement thereto.

In FIG. 2 the elongated bar is shown in the position it assumes when the bar has been moved from the right to the left in its back and forth movement. During such movement of the bar 16 toward the left in FIG. 2, the rollers 1 to 5 and shiftable sections of rollers 6 to 11 have been moved from their inclined positions to their perpendicular positions. Let us now assume that the bar 16 moves toward the right from the position shown in FIG. 2 to move the rollers 1 to 5 and shiftable parts of the rollers 6 to 11 from their perpendicular positions to their inclined positions. When movement toward the right in FIG. 2 is initially imparted to the bar 16, movement will only be imparted to post $17^7$ because this post snugly fits between the actuating members $23^7$–$23^{7a}$. As will be explained presently, post $17^7$ is the only post to which movement is imparted by the bar 16 during its entire stroke from right to left in FIG. 2. It will be seen in FIG. 2 that actuating member $23^{6a}$ will not be effective to move post $17^6$ until the bar 16 has moved through a short distance. The actuating member $23^{5a}$ will not impart movement to the post $17^5$ until the bar 16 has moved toward the right a greater distance. The bar must travel an even greater distance before the actuating member $23^{4a}$ acts upon the post $17^4$.

In view of the foregoing, it will be clear that the clearance between each pair of actuating elements in both directions from the actuating elements $23^7$–$23^{7a}$ for the post $17^7$ is successively larger or greater. When the clearance or gap between actuating elements $23^6$–$23^{6a}$ is compared with the clearance between actuating elements $23^5$–$23^{5a}$, it will be seen that the gap between the pair of last-mentioned actuating elements is greater than the gap between the pair of first-mentioned actuating elements. This will be further evident when the clearance or gap between the pair of actuating elements $23^5$–$23^{5a}$ for the post $17^5$ is compared with the clearance or gap between the pair of actuating elements $23^4$–$23^{4a}$ for the post $17^4$.

In order to provide a gap of sufficient length between the actuating elements adapted to act on the posts $17^2$ and $17^1$, it is necessary to employ the extension arms $43^2$ and $43^1$ to locate the pin $22^2$ and $22^1$ at the positions illustrated in FIG. 2 and provide gaps or clearances of sufficient length between the pair of actuating elements $23^2$–$23^3$ for pin $22^2$ and the pair of actuating elements $23^1$–$23^2$ for the pin $22^1$.

In a similar manner the extension arms $43^{10}$ and $43^{11}$ are provided for the posts $17^{10}$ and $17^{11}$ to provide gaps and clearances of proper length between the pairs of actuating elements $23^{10}$ and $23^{11}$ for the post $22^{10}$ and between the pair of actuating elements $23^{11}$ and $23^{11a}$ for the pin $22^{11}$.

Actuating elements $23^1$ and $23^{11a}$ at the extreme ends of the elongated bar not only function as one of the elements of the pairs of actuating elements $23^1$ and $23^2$ for the pin $22^1$ and as one of the elements of the pair of actuating elements $23^{11}$ and $23^{11a}$ for the pin $22^{11}$, respectively, but also can function as stops to limit the extent of the back and forth movement of the bar 16. As best shown in FIG. 3, the actuating element $23^1$, responsive to movement of the bar 16 toward the right, will contact the right-hand bearing 24 and stop movement of the bar 16. The actuating element $23^{11a}$, responsive to movement of the bar 16 toward the right, will contact the left-hand bearing 24 and stop the movement of the bar.

The roller 7 may be referred to as a first roller. In view of the manner in which the actuating elements 23 are arranged on the elongated bar 16, the first roller 7 will be shifted to an inclined position having a larger angle with respect to its perpendicular position than the angles formed by the other rollers between their inclined positions and their respective perpendicular positions, as will be evident when the dotted line position of roller 7 is compared with the dotted line positions of the other rollers in FIG. 1. Further, the actuating members 23 are so arranged on the bar 16 that successive rollers beyond the rollers 6 and 8, which may be referred to as second rollers, will be shifted to inclined positions having a smaller angle with respect to its perpendicular position than the roller adjacent thereto nearer to the first roller.

An air inlet cylinder 46, having a piston 47 therein connected to the elongated bar 16, may be employed to move the bar back and forth to shift the rollers between their perpendicular and their inclined positions. Back and forth movement of the bar 16 by the air cylinder 46 may be controlled by a pair of control members 48 and 49. The control members 48 and 49, which may be hand-operated, form parts of pilot control valves 50 and 51, respectively, which are connected in pilot air control systems 52 and 53, respectively. The control valves 50 and 51 are movable between their open and closed positions and normally biased to their closed positions.

When the pilot control valve 50 is moved to its open position by depressing the control member 48, the pilot air control system 52 becomes operable to cause master control valve 54 to function to effect movement of the piston 47 in air cylinder 46 toward the right and move the bar 16 to shift the rollers from their perpendicular to their inclined positions. When the bar 16 has completed its stroke to the right, the control member 48 is released. When the pilot control valve 51 is moved to its open position by depressing the control member 49, the pilot air cylinder system 53 becomes operable to cause master control valve 54 to function to effect movement of the piston 47 in cylinder 46 toward the left and move the bar 16 to shift the rollers from their inclined positions to their perpendicular positions. When the bar 16 has completed its stroke to the left, the control member 49 is released.

In view of the foregoing, it will now be understood that the transfer unit T may be divided into first and second areas A and B, respectively, some of the rollers $28^6$ to $28^{11}$ which are rotatable about fixed axes and perpendicular to the direction in which articles move on the first conveyor 12, define the first area A. Other rollers 1 to 11, which are shiftable between perpendicular and inclined positions, define the second area B.

The rollers $28^6$ to $28^{11}$ in the first area A and the rollers 1 to 11 in the second area B, when in their perpendicular positions, function to move articles on the first conveyor A. The rollers 1 to 11 in their inclined positions function to divert articles from the first roller conveyor 12 to the second roller conveyor 13. The line of demarcation between the rollers in the second area B and the rollers in the first area A of the transfer unit T extend diagonally across the top of the transfer unit from a first region C at the side of the first roller conveyor 12 remote from the second roller conveyor 13 and initially reached by articles moving on the first roller conveyor to a second region D at the opposite side of the first conveyor 12 near the second conveyor 13 and subsequently reached by the articles moving on the first roller conveyor 12. With this arrangement the rollers 1 to 11 in the second area B in their inclined positions will always exercise control over articles on the first roller conveyor 12 that move thereon and function to divert articles from the first roller conveyor to the second roller conveyor 13.

In FIG. 1 it will be seen that additional rollers like the roller 31 may be provided on the transfer unit T. The second conveyor 13, at a region close to the transfer unit T, is provided with rollers $29^{7-9}$ and $30^{5-6}$ which are successively shorter in length. The remaining rollers $29^{1-6}$ and $30^{1-4}$ of the second conveyor 13 are of substantially equal length and alongside one another and together define the width of the second conveyor at a region close to the first conveyor 12.

FIGS. 5 to 10 illustrate a roller conveyor construction which is especially suitable when a transfer unit like the transfer unit T is employed. The roller conveyor 60 in FIG. 5 comprises supporting legs 61, 62 and 63. Bracing arms 64 are provided at the upper ends of the legs 61, 62 and 63. The lower ends of the bracing arms 64 are detachably connected at 65 to the legs 61, 62 and 63 by U-shaped members 66 and 67, as shown in FIG. 10. The U-shaped members 66 and 67 are held together at 68 and 69 by bolts and tightening nuts.

FIG. 7 illustrates the manner in which the upper ends of the legs 61 are detachably secured at 70 to the bottom flange 71 of a side rail 72 in which the rollers 73 are rotatably mounted.

FIG. 8 illustrates one manner in which the side rail 72a is clamped between members 74 and 75 detachably connected to one another at 76 to a part of the conveyor supporting structure.

FIG. 9 illustrates another manner in which the side rail 72b is clamped between members 77 and 78 detachably connected at 79 to a part of the roller conveyor supporting structure.

While we have shown and described particular embodiments of our invention, it will be obvious to those skilled in the art that modifications may be made, and that certain features may be independently used of others, without departing from the spirit and scope of our invention.

We claim:

1. The combination with a roller conveyor system for moving articles thereon by gravity, the system including a first roller conveyor and a second roller conveyor transverse thereto, of a transfer unit for selectively transferring articles from the first roller conveyor to the second roller conveyor, said transfer unit comprising:

roller means including rollers forming a part of the first roller conveyor, said roller means defining first and second areas of said transfer unit, said roller means in said first area comprising some of said rollers, means for mounting said rollers in said first area for rotation about fixed axes substantially perpendicular to the direction of movement of articles on the first conveyor, said roller means in said second area comprising other of said rollers, said rollers in said second area being shiftable between perpendicular and inclined positions, said rollers in said second area in their perpendicular positions having their axes of rotation perpendicular to the direction of movement of articles on the first roller conveyor and in their inclined positions having their axes of rotation at acute angles with respect to their perpendicular positions and inclined toward the side of the first roller conveyor nearer to the second roller conveyor, structure providing a horizontal surface, said surface having a first elongated slot at the side of the first roller conveyor nearer to the second roller conveyor and a plurality of second slots opposite the first slot and perpendicular thereto, means for journaling said rollers in said second area in their perpendicular and in their inclined positions, means for shifting said rollers in said second area between their perpendicular and their inclined positions, said means for shifting said rollers in said second area between their perpendicular and their inclined positions comprising structure for moving the ends of said rollers nearer the second roller conveyor back and forth lengthwise of the first roller conveyor between their perpendicular and their inclined positions and for simultaneously moving therewith the opposite ends of said rollers remote from the second roller conveyor back and forth transversely of the first roller conveyor between their perpendicular and their inclined positions, said rollers in said first area and said rollers in said second area in their perpendicular positions functioning to move articles on the first roller conveyor, said rollers in said second area in their inclined positions functioning to divert articles from the first roller conveyor to the second roller conveyor, and the line of demarcation between said rollers in said second area and said rollers in said first area of said transfer unit extending diagonally across the top of said transfer unit from a first region at the side of the first roller conveyor remote from the second roller conveyor and initially reached by articles moving on the first roller conveyor to a second region at the opposite side of the first conveyor nearer to the second conveyor and subsequently reached by the articles moving on the first roller conveyor, whereby said rollers in said second area in their inclined positions always exercise control over articles on the first roller conveyor that move thereon and function to divert said articles from the first roller conveyor to the second roller conveyor, said means for journaling said rollers in said second area in their perpendicular and in their inclined positions comprising a plurality of brackets having vertical and horizontal arms, the vertical arms of said brackets being notched at the tops thereof, the ends of said rollers in said second area having shafts, each of said notches receiving a different one of said shafts, elements fixed to the horizontal arms of said brackets and depending downward therefrom, said elements at the ends of said rollers nearer the second roller conveyor extending downward through the first slot and each of said elements at the opposite ends of said rollers remote from the second roller conveyor extending downward through a different one of the second slots, the horizontal arms of said brackets being movable over the surface, the first slot defining a substantially straight first line extending lengthwise of the first roller conveyor and the second slots defining substantially straight second lines which are substantially perpendicular to the first slot, said means for shifting said rollers in said second area between their perpendicular and their inclined positions including mechanism for imparting back and forth movement to said elements in the first slot, and said elements in the second slots moving back and forth therein responsive to back and forth movement of said elements in the first slot.

2. A transfer unit as set forth in claim 1 in which said mechanism comprises an elongated bar, a plurality of pairs of actuating elements fixed to said bar and distributed along the latter, each of said elements in the first slot being disposed between and in the path of movement of a different pair of said actuating elements, said element of said first roller snugly fitting between a first pair of said actuating elements without clearance therebetween, whereby the end of said first roller nearer the second roller conveyor moves responsive to movement of said elongated bar in one direction of its back and forth movement to shift said first roller from its perpendicular position to its inclined position, and said elements in the first slot at opposite sides of said element of said first roller each being disposed between a different pair of said actuating elements with clearance therebetween, the clearance between each pair of actuating elements in both directions from said one pair of actuating elements being successively greater.

3. The combination with a roller conveyor system for moving articles thereon by gravity, the system including a first roller conveyor and a second roller conveyor transverse thereto, of a transfer unit for selectively transferring articles from the first roller conveyor to the second roller conveyor, said transfer unit comprising:

roller means including rollers forming a part of the first roller conveyor, said roller means defining first and second areas of said transfer unit, said roller means in said first area comprising some of said rollers, means for mounting said rollers in said first area for rotation about fixed axes substantially perpendicular to the direction of movement of articles on the first conveyor, said roller means in said second area comprising other of said rollers, said rollers in said second area being shiftable between perpendicular and inclined positions, said rollers in said second area in their perpendicular positions having their axes of rotation perpendicular to the direction of movement of articles on the first roller conveyor and in their inclined psitions having their axes of rotation at acute angles with respect to their perpendicular positions and inclined toward the side of the first roller conveyor nearer to the second roller conveyor, means for journaling said rollers in said second area in their perpendicular and in their inclined position, means for shifting said rollers in said second area between their perpendicular and their inclined positions, said means for shifting said rollers in said second area between their perpendicular and their inclined positions comprising structure for moving the ends of said rollers nearer the second roller conveyor back and forth lengthwise of the first roller conveyor between their perpendicular and their inclined positions and for simultaneously moving therewith the opposite ends of said rollers remote from the second roller conveyor back and forth transversely of the first roller conveyor between their perpendicular and their inclined positions, said rollers in said first area and said rollers in said second area in their perpendicular positions functioning to move articles on the first roller conveyor, said rollers in said second area in their inclined positions functioning to divert articles from the first roller conveyor to the second roller conveyor, and the line of demarcation between said rollers in said second area and said rollers in said first area of said transfer unit extending diagonally across the top of said transfer unit from a first region at the side of the first roller conveyor remote from the second roller conveyor and initially reached by articles moving on the first roller conveyor to a second region at the opposite side of the first conveyor nearer to the second conveyor and subsequently reached by the articles moving on the first roller conveyor, whereby said rollers in said second area in their inclined positions always exercise control over articles on the first roller conveyor that move thereon and function to divert said articles from the first roller conveyor to the second roller conveyor, said rollers in said second area including a first roller and a plurality of rollers at opposing sides of said first roller and said moving structure comprising an elongated memebr, a plurality of pairs of actuating elements fixed to said member and distributed along the latter, each of said rollers in said second area at the end thereof nearer the second roller conveyor having a part disposed between and in the path of movement of a different pair of said actuating elements, said part of said first roller snugly fitting between a first pair of said actuating elements without clearance therebetween, whereby the end of said first roller nearer the second roller conveyor moves responsive to the movement of said elongated member in one direction of its back and forth movement to shift said first roller from its perpendicular position to its inclined position, and said parts of said rollers at opposite sides of said first roller each being disposed between a different pair of said actuating elements with clearance therebetween, the clearance between each pair of actuating elements in both directions from said one pair of actuating elements being successively greater.

4. The combination with a roller conveyor system for moving articles thereon by gravity, the system including a first roller conveyor and a second roller conveyor transverse thereto, of a transfer unit for selectively transferring articles from the first roller conveyor to the second roller conveyor, said transfer unit comprising:

roller means including rollers forming a part of the first roller conveyor, said roller means defining first and second areas of said transfer unit, said roller means in said first area comprising some of said rollers, means for mounting said rollers in said first area for rotation about fixed axes substantially perpendicular to the direction of movement of articles on the first conveyor, said roller means in said second area comprising other of said rollers, said rollers in said second area being shiftable between perpendicular and inclined positions, said rollers in said second area in their perpendicular positions having their axes of rotation perpendicular to the direction of movement of articles on the first roller conveyor and in their inclined positions having their axes of rotation at acute angles with respect to their perpendicular positions and inclined toward the side of the first roller conveyor nearer to the second roller conveyor, means for journaling said rollers in said second area in their perpendicular and in their inclined positions, means for shifting said rollers in said second area between their perpendicular and their inclined positions, said means for shifting said rollers in said second area between their perpendicular and their inclined positions comprising structure for moving the ends of said rollers nearer the second roller conveyor back and forth lengthwise of the first roller conveyor between their perpendicular and their inclined positions and for simultaneously moving therewith the opposite ends of said rollers remote from the second roller conveyor back and forth transversely of the first roller conveyor between their perpendicular and their inclined positions, said rollers in said first area and said rollers in said second area in their perpendicular positions functioning to move articles on the first roller conveyor, said rollers in said second area in their inclined positions functioning to divert articles from the first roller conveyor to the second roller conveyor, and the line of demarcation between said rollers in said second area and said rollers in said first area of said transfer unit extending diagonally across the top of said transfer unit from a first region at the side of the first roller conveyor remote from the second roller conveyor and initially reached by articles moving on the first roller conveyor to a second region at the opposite side of the first conveyor nearer to the second conveyor and subsequently reached by the articles moving on the first roller conveyor, whereby said rollers in said second area in their inclined positions always exercise control over articles on the first roller conveyor that move thereon and function to divert said articles from the first roller conveyor to the second roller conveyor, said moving structure comprising an elongated member movable back and forth lengthwise of the first roller conveyor, means for transferring the back and forth movement of said elongated member to the ends of said rollers nearer the second roller conveyor, means for moving said member back and forth comprising an air cylinder and means including a master control valve for controlling the supply of air thereto under pressure from a source of supply, a pilot air control system for regulating the master control valve including first and second valves movable between open and closed positions and biased to their closed positions, means responsive to opening of one of said valves in said pilot air control system to render said master control valve operable to actuate said air cylinder and move said elongated member in one direction of its back and forth movement, and means responsive to opening of the other of said valves in said pilot air control system to render said master control valve operable to actuate said air cylinder and move said elongated member in the opposite direction of its back and forth movement.

5. The combination with a roller conveyor system for moving articles thereon by gravity, the system including a first roller conveyor and a second roller conveyor transverse thereto, of a transfer unit for selectively transferring articles from the first roller conveyor to the second roller conveyor, said transfer unit comprising:

roller means including rollers forming a part of the first roller conveyor, said roller means defining first and second areas of said transfer unit, said roller means in said first area comprising some of said rollers, means for mounting said rollers in said first area for rotation about fixed axes substantially perpendicular to the direction of movement of articles on the first conveyor, said roller means in said second area comprising other of said rollers, said rollers in said second area being shiftable between perpendicular and inclined positions, said rollers in said second area in their perpendicular positions having their axes of rotation perpendicular to the direction of movement of articles on the first roller conveyor and in their inclined positions having their axes of rotation at acute angles with respect to their perpendicular positions and inclined toward the side of the first roller conveyor nearer to the second roller conveyor, means for journaling said rollers in said second area in their perpendicular and in their inclined positions, means for shifting said rollers in said second area between their perpendicular and their inclined positions, said rollers in said first area and said rollers in said second area in their perpendicular positions functioning to move articles on the first roller conveyor, said rollers in said second area in their inclined positions functioning to divert articles from the first roller conveyor to the second roller conveyor, and the line of demarcation between said rollers in said second area and said rollers in said first area of said transfer unit extending diagonally across the top of said transfer unit from a first region at the side of the first roller conveyor remote from the second roller conveyor and initially reached by articles moving on the first roller conveyor to a second region at the opposite side of the first conveyor nearer to the second conveyor and subsequently reached by the articles moving on the first roller conveyor, whereby said rollers in said second area in their inclined positions always exercise control over articles on the first roller conveyor that move thereon and function to divert said articles from the first roller conveyor to the second roller conveyor, said rollers in said second area including a first roller and a plurality of rollers at opposing sides of said first roller, said means for shifting said rollers in said second area between their perpendicular positions and their inclined positions including mechanism for shifting said first roller to an inclined position having a larger angle with respect to its perpendicular position than the angles formed by said other rollers in said second area between their inclined positions and their respective perpendicular positions and for shifting successive rollers in said second area beyond second rollers at each side of said first roller to an inclined position having a smaller angle with respect to its perpendicular position than the roller adjacent thereto and nearer to said first roller, said shifting means comprising an elongated member, a plurality of pairs of actuating elements fixed to said member and distributed along the latter, each of said rollers in said second area at the end thereof nearer the second roller conveyor having a part disposed between and in the path of movement of a different pair of said actuating elements, said part of said first roller snugly fitting between a first pair of said actuating elements without clearance therebetween, whereby the end of said first roller nearer the second roller conveyor moves responsive to movement of said elongated member in one direction of its back and forth movement to shift said first roller from its perpendicular position to its inclined position, and said parts of said rollers at opposite sides of said first roller each being disposed between a different pair of said actuating elements with clearance therebetween, the clearance between each pair of actuating elements in both directions from said one pair of actuating elements being successively greater.

References Cited

UNITED STATES PATENTS

| 2,284,400 | 5/1942 | Lueckel | 193—36 |
| 2,794,529 | 6/1957 | Schmitz | 193—36 |

FOREIGN PATENTS

| 944,480 | 6/1956 | Germany. |
| 746,882 | 3/1956 | Great Britain. |

EVON C. BLUNK, *Primary Examiner.*

H. C. HORNSBY, *Assistant Examiner.*